United States Patent [19]
Langan et al.

[11] Patent Number: 5,778,444
[45] Date of Patent: Jul. 7, 1998

[54] METHOD AND APPARATUS FOR RESET-SENSITIVE AND CONTROLLED REGISTER WRITE ACCESSES IN A DATA PROCESSING SYSTEM WITH USER AND TEST MODES

[75] Inventors: John A. Langan; Philip B. Drake; Rebecca A. Leiser, all of Austin, Tex.

[73] Assignee: Motorola, Inc., Schaumburg, Ill.

[21] Appl. No.: 643,647

[22] Filed: May 6, 1996

[51] Int. Cl.$^6$ ............................................. G06F 13/00
[52] U.S. Cl. ................. 711/163; 711/154; 364/DIG. 1
[58] Field of Search ............................ 395/500, 535, 395/657, 490, 412; 711/163

[56] References Cited

U.S. PATENT DOCUMENTS

| Re. 27,239 | 11/1971 | Ulrich | 340/172.5 |
|---|---|---|---|
| 4,093,987 | 6/1978 | Gaudette et al. | 364/200 |
| 4,489,380 | 12/1984 | Carey et al. | 364/200 |
| 4,498,131 | 2/1985 | Brait et al. | 711/202 |
| 4,580,246 | 4/1986 | Sibigtroth | 365/195 |
| 5,161,122 | 11/1992 | Robertson | 711/163 |
| 5,193,199 | 3/1993 | Dalrymple et al. | 395/651 |
| 5,539,901 | 7/1996 | Ramirez | 395/500 |
| 5,574,894 | 11/1996 | Iles et al. | 395/555 |

FOREIGN PATENT DOCUMENTS 0 300 406 A2  1/1989  European Pat. Off.

OTHER PUBLICATIONS

Motorola, Inc., "HC11 M68Hc11 Reference Manual.", M68HC11RM/AD, Prentice Hall, pp. 3–6 through 3–9 (1988).

*Primary Examiner*—Tod R. Swann
*Assistant Examiner*—David Ldugahr
*Attorney, Agent, or Firm*—Sandra L. Godsey

[57] ABSTRACT

A method for accessing a control register in a data processing system which ignores a first write to sensitive control bits when in a first mode, but allows subsequent writes to the sensitive control bits. When operating in a user mode, the method allows a first write to the sensitive control bits, but does not allow any subsequent writes. When a write access is made to the sensitive control bits during test mode only non-initial writes are effective. When a write access is made to the sensitive control bits during user mode only an initial write is effective. The method is effective in a data processing system having a control register write access scheme.

19 Claims, 4 Drawing Sheets

NECLK — NO E-CLOCK
LSTRE — LOW STROBE ENABLE
IVIS — INTERNAL VISIBILITY

METHOD AND APPARATUS FOR RESET-SENSITIVE AND CONTROLLED REGISTER WRITE ACCESSES IN A DATA PROCESSING SYSTEM WITH USER AND TEST MODES

REFERENCE TO RELATED APPLICATIONS

The present application is related to the following U.S. patent application and patent:

"Method and Apparatus for Controlling Show Cycles in a Data Processing System", invented by Jay A. Hartvigsen et al., U.S. Pat. No. 5,675,749, filed on Jun. 2, 1995 and issuing on Oct. 7, 1997, and assigned to the assignee hereof; and "Method and Apparatus for Providing an External Indication of Internal Cycles in a Data Processing System", invented by Jay A. Hartvigsen et al., application Ser. No. 08/458,390, filed on Jun. 2, 1995, currently pending before the Patent and Trademark Office and assigned to the assignee hereof.

FIELD OF THE INVENTION

The present invention relates in general to a data processing system, and more particularly to a method for accessing a register in a data processor.

BACKGROUND OF THE INVENTION

Protected Control Registers

In a microprocessor system, certain "control" registers and bits are used to determine system configuration. Many data processors have sensitive control registers and bits which are protected against writes except under special circumstances. Typical protect mechanisms include the ability to write these bits only within a certain period after reset and the ability to write them once after each reset. These bits control the basic configuration of the data processor and an accidental write could cause serious system problems. Once set, control bits remain unchanged until the part is reset. Protections make it practical to include software-controlled features that might otherwise be excluded. The number of potential control registers and bits increases with the complexity of a data processor. This poses a problem for those register accessing schemes which require all writes to control registers be done during a certain period.

Operating Modes

To maintain system integrity, in "normal" or "user" operating mode, sensitive control bits are typically allowed to be written only one time. Protect mechanisms may be overridden in "special" operating modes, where bits may be changed repeatedly without going through a reset sequence. An override feature is particularly useful during test, where as many possible configurations must be achieved in a minimum amount of time. During emulator operating mode, the data processor maintains a predetermined configuration and it is desirable to prohibit writes to sensitive control registers, as for example where a pin configuration must be maintained to enable a port replacement unit. Many schemes have been developed to adapt to the needs of the various modes.

Emulator modes are designed to allow the user visibility into a data processor's actual operation. As design complexity increases, emulation becomes essential to application development. In practice, additional code must often be written to accommodate the emulation set up. This additional code adds a level of complexity and introduces ambiguity into the emulation process. It is desirable to define a consistent control scheme in which emulation is not corrupted by the user's code.

DESCRIPTION OF PREFERRED EMBODIMENT

Figure 1:
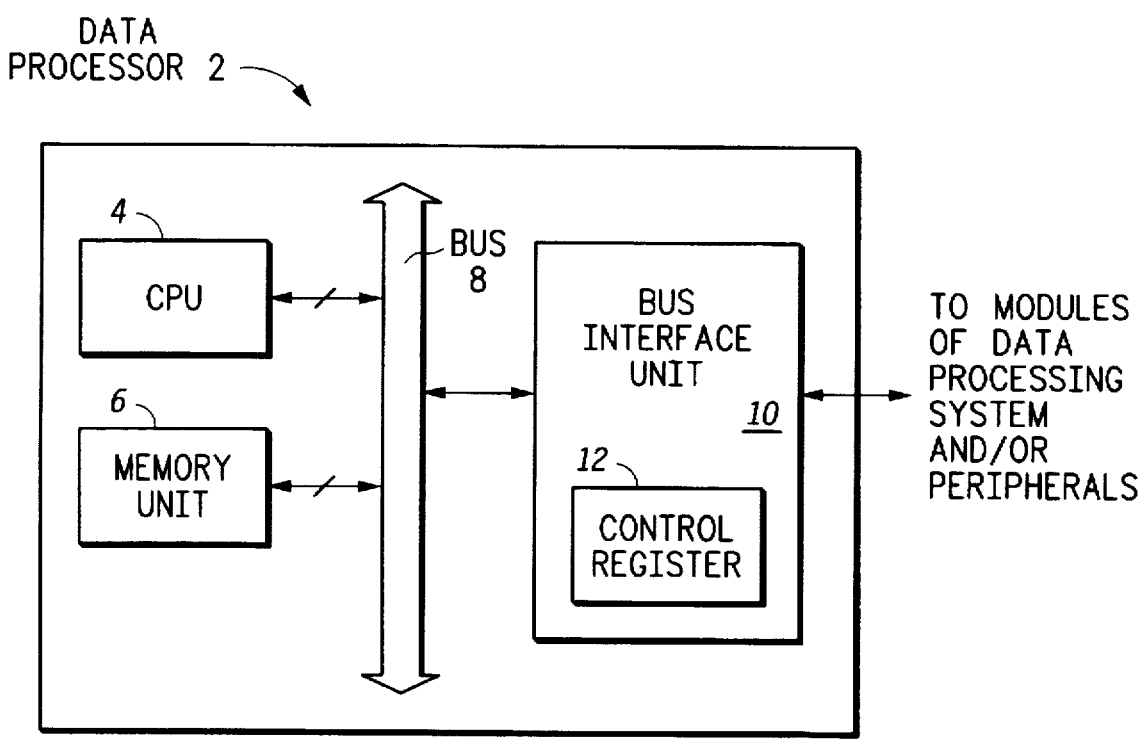
FIG. 1 illustrates, in block diagram form, a data processor in accordance with one embodiment of the present invention.

General: In the following description, numerous specific details are set forth such as specific control register bit lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Terminology: The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The present invention: The present invention provides a method for accessing a register in a data processor which allows control selection bits to be written once with no effect and able to be written thereafter with effect. In one embodiment of the present invention, user mode allows control selection bits to be written once. Subsequent writes have no effect, but in a "special" mode used for test and emulation, the initial write has no effect, however all subsequent writes are valid.

With reference to system configuration and control, an exemplary embodiment employs a write to a register bit. Alternate embodiments employ any number of methods to render (i.e. assert or negate) register bits, including but not limited to logical operations and software instructions. In each case, upon entering a "special" mode, control bits are not effective on an initial rendering, but are effective on subsequent renderings.

The present invention allows application code to be run in emulator mode without modification, while ensuring certainty and stability of the system configuration. The present invention adds to the flexibility of a data processor's emulation. Additionally, the present invention provides a method of code verification detecting multiple writes to the control register.

Refer now to the drawings wherein depicted elements are not necessarily shown to scale and wherein like or similar elements are designated by the same reference numeral through the several views.

Description of Figures

FIG. 1 illustrates one embodiment of the present invention, where Central Processing Unit (CPU) 4, Bus 8, Bus Interface Unit 10, Control Register 12, and Memory Unit 6 are all part of Data Processor 2. CPU 4, Memory Unit 6, and Bus Interface Unit 10 are each coupled to Bus 8 by multiple bidirectional conductors. Bus Interface Unit 10 communicates with other modules and peripherals by way of multiple bidirectional conductors. Bus Interface Unit 10 includes Control Register 12, which is used to affect the system configuration of Data Processor 2.

Figure 2:
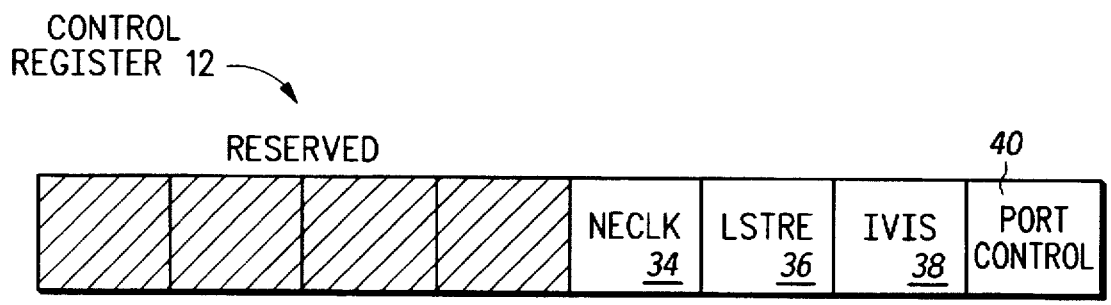
FIG. 2 illustrates, the structure of a control register in accordance with one embodiment of the present invention.

A detailed description of Control Register 12 is illustrated in FIG. 2. In one embodiment of the present invention, Control Register 12 is eight bits in length, having the upper four bits reserved. The lower four bits are designated as "No E-Clock" (NECLK) 34, "Low Strobe Enable" (LSTRE) 36, Internal Visibility (IVIS) 38, Port Control 40. The significance of each bit depends on operating mode.

Figure 3:
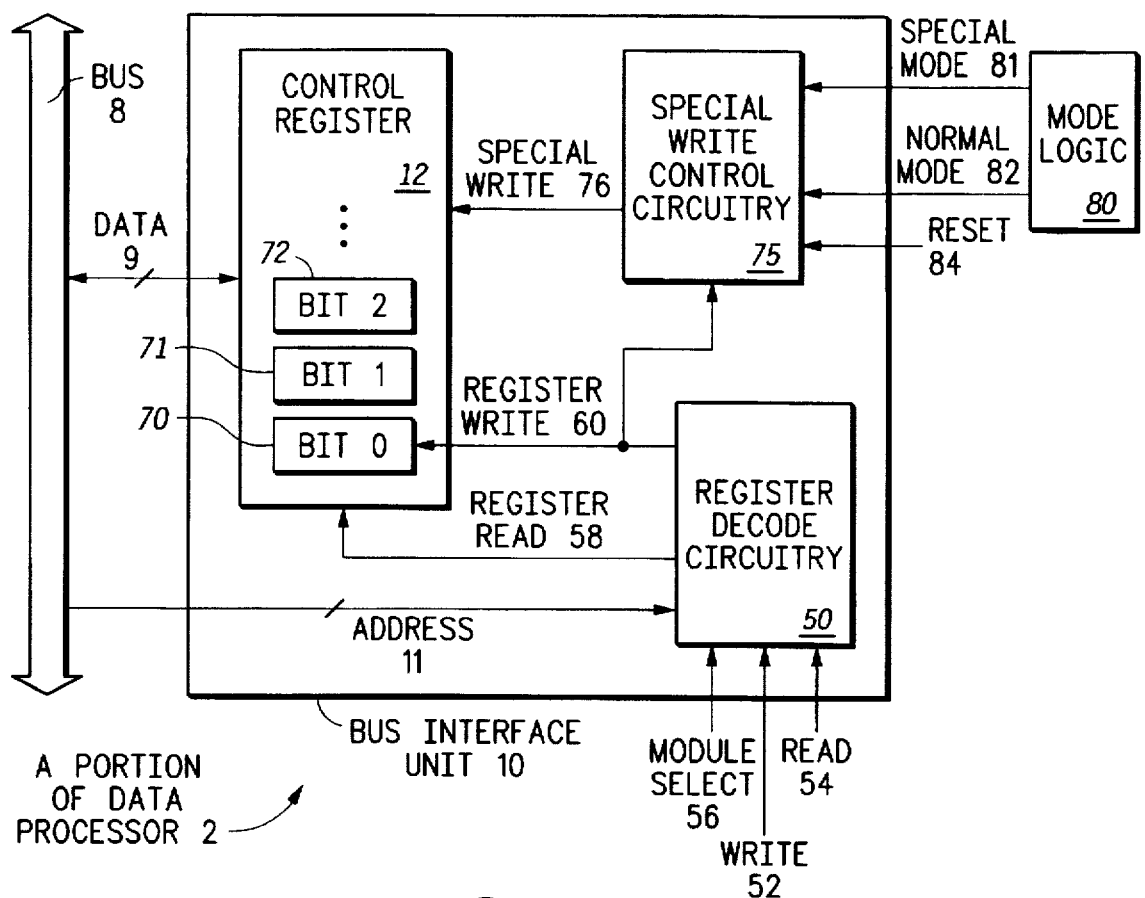
FIG. 3 illustrates, in block diagram form, a bus interface unit in accordance with one embodiment of the present invention.

Referring to FIG. 3, an example of Bus Interface Unit 10 is illustrated in FIG. 3. In one embodiment of the present invention Bus 8, Bus Interface Unit 10, and Mode Logic 80 are contained in Data Processor 2. Bus Interface Unit 10 includes Control Register 12, Special Write Control Circuitry 75, and Register Decode Circuitry 50.

To communicate data information, Bus 8 is coupled to Bus Interface Unit 10 through Control Register 12 via bidirectional conductors of Data 9, where Control Register 12 includes several bits of information. In one embodiment, Bit 0 70 is not available to Special Write Control Circuitry 75, but Bit 1 71, and Bit 2 72, which are exemplary of a plurality of other bits in Control Register 12, are controlled by Special Write Control Circuitry 75.

In one embodiment of the present invention, signal Mode Logic 80 indicates the mode of operation as normal or "special" mode. In "special" mode Special Write Control Circuitry 75, after reset, prevents an initial write to bits in Control Register 12 which are controlled by Special Write Control Circuitry 75, but allows all subsequent writes. Bits controlled by Special Write Control Circuitry 75 are referred to as sensitive control bits.

To communicate address information, Bus 8 is coupled to Register Decode Circuitry 50 via conductors of Address 11. Register Decode Circuitry 50 also receives signals Module Select 56, Write 52, and Read 54. In one embodiment of the present invention, these signals are received via individual conductors, but alternate embodiments may use any number of conductors or multiplexed conductors. Further, Register Decode Circuitry 50 receives signals indicating the operation as a write or a read. Signal Write 52 indicates when the operation is a write. Address 11 is also received by Register Decode Circuitry 50. In one embodiment of the present invention, when Address 11 and Module Select 56 indicates Control Register 12, the read and write information presented by signals Read 54 and Write 52 are passed to Register Read 58 and Register Write 60, respectively. Only one of Read 54 and Write 52 is active during a bus cycle, therefore only one of Register Read 58 and Register Write 60 is effective when Address 11 indicates Control Register 12.

Further, Register Decode Circuitry 50 receives signals indicating the next operation, a write or a read. Register Write 60 selects data write to Control Register 12, and is used to affect a write to both sensitive control bit(s) (i.e. bit(s) controlled by Special Control Circuitry 75) as well as other bit(s) in Control Register 12. Likewise, signal Register Read 58 selects data read of Control Register 12, and is capable of affecting a read in both sensitive control bit(s) and other bit(s) of Control Register 12.

Still referring to FIG. 3, Register Decode Circuitry 50 initiates data read of Control Register 12 via signal Register Read 58 and initiates data write via signal Register Write 60. Register Write 60 is also provided to Special Write Control Circuitry 75, which inhibits an initial write after reset and allows subsequent writes to sensitive control bit(s) in Control Register 12 via Special Write 76. In one embodiment of the present invention, Special Write 76 is sent on a single conductor which couples Special Write Control Circuitry 75 to Control Register 12. Alternate embodiments may employ a single conductor or any number of conductors.

In one embodiment, Special Write Control Circuitry 75 receives signal Register Write 60 by way of a conductor from Register Decode Circuitry 50. Signal Reset 84 is supplied to Special Write Control Circuitry 75 by way of a conductor, indicating Data Processor 2 reset. Mode logic 80 determines the operating mode of Data Processor 2 and supplies signals Special Mode 81 and Normal Mode 82, accordingly, to Special Write Control Circuitry 75 by way of conductors. Note that one embodiment has an individual conductor for each signal. Alternate embodiments may employ multiple conductors or a combination of individual and multiple conductors. In one embodiment, Special Control Write Circuitry 75 receives signal Reset 84, via a conductor.

Signal Special Mode 81 indicates that Data Processor 2 is operating in "special" mode. For Data Processor 2 operation in "special" mode, Special Write Control Circuitry 75 acts to inhibit the initial write to sensitive control bits in Control Register 12, rendering that write ineffective. Note that Special Write Control Circuitry 75 does not affect writes to bits which are not sensitive control bits. Further, in "special" mode, Special Write Control Circuitry 75 acts to enable subsequent writes to sensitive control bits, rendering subsequent writes effective.

Signal Normal Mode 82 indicates operation in normal or user mode. For Data Processor 2 operation in normal mode, Special Write Control Circuitry 75 does not act to inhibit the initial write to sensitive control bits in Control Register 12. Further, in normal mode, Special Write Control Circuitry 75 does not act to enable subsequent writes to sensitive control bits. In one embodiment of the present invention, for Data Processor 2 operation in normal mode, Special Write Control Circuitry 75 acts to enable the initial write to sensitive control bits in Control Register 12, while inhibiting all subsequent writes to those bits.

In alternate embodiments of the present invention, Control Register 12 contains only sensitive control bits and is considered a sensitive control register. In one embodiment of the present invention, Control Register 12 contains sensitive control bits, other control bits, and bits not associated with control. Alternate embodiments may have any combination of bits in Control Register 12 or may incorporate multiple registers.

Figure 4:
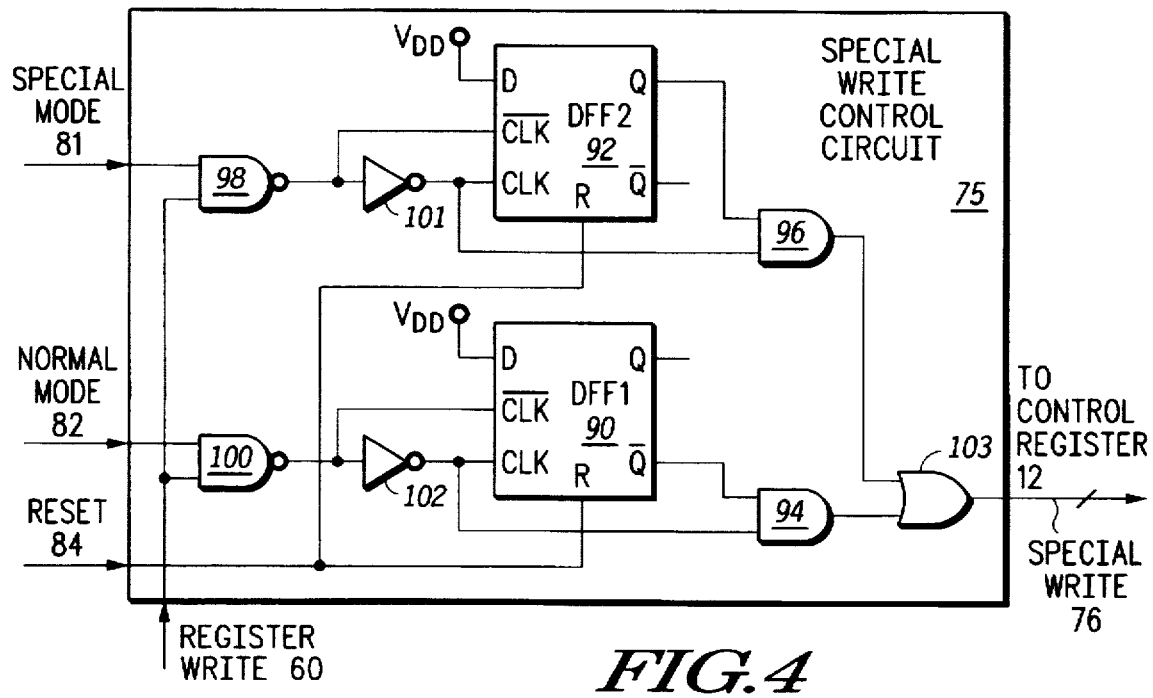
FIG. 4 illustrates, in circuit diagram form, special write control circuitry in accordance with one embodiment of the present invention.

FIG. 4 illustrates one embodiment of Special Write Control Circuitry 75, receiving signals Special Mode 81, Normal Mode 82, and Reset 84 by way of individual conductors. Signal Register Write 60 is provided by way of a conductor coupled with Register Decode Circuitry 50. In one embodiment, Special Write Control Circuit 75 is coupled to Control Register 12 via multiple conductors. In one embodiment of the present invention, Special Write Control Circuit 75 contains two flip-flops, DFF2 92 and DFF1 90, as well as logic gates 94, 96, 98, 100, 101, 102, and 103.

Figure 5:
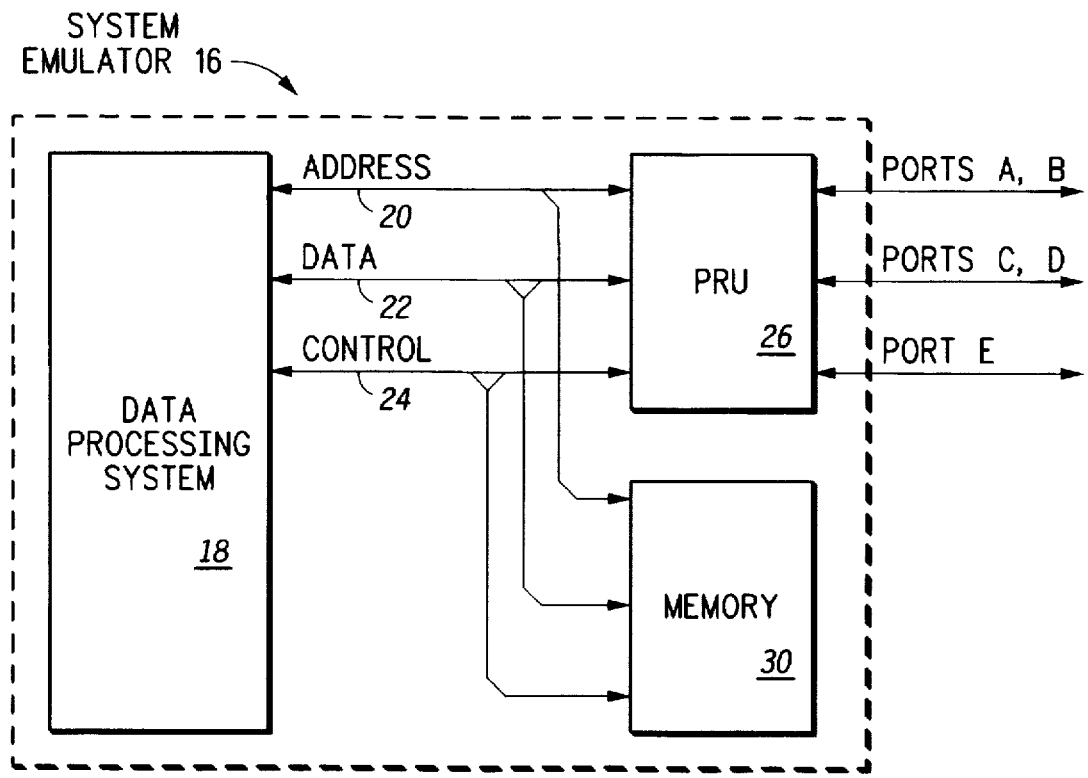
FIG. 5 illustrates, in block diagram form, an emulator in accordance with one embodiment of the present invention.

One embodiment of the present invention has a "special" operating mode used for emulation and test. A System Emulator 16 uses "special" mode to emulate Data Processing System 18, as illustrated in FIG. 5. In one embodiment of the present invention, Data Processing System 18, Port Replacement Unit (PRU) 26, and Memory 30 are all part of System Emulator 16. Data Processing System 18 provides address information to PRU 26 and to Memory 30 by way of bidirectional conductors, Address 20, and in alternate embodiments, may be unidirectional conductors. Data Processing System 18, PRU 26, and Memory 30 each send and receive data information by way of bidirectional conductors, Data 22. Likewise, Data Processing System 18, PRU 26, and Memory 30 each send and receive control information by way of bidirectional conductors, Control 24. In one embodiment of the present invention, a user is able to emulate Data Processing System 18 using application code without modification using System Emulator 16. System Emulator 16 communicates with user's application through PRU 26. PRU 26 sends and receives signals to user's application by way of bidirectional conductors assigned to each of the represented ports. Note that in one embodiment of the present invention, Data Processing System 18 is an integrated circuit.

Figure 6:
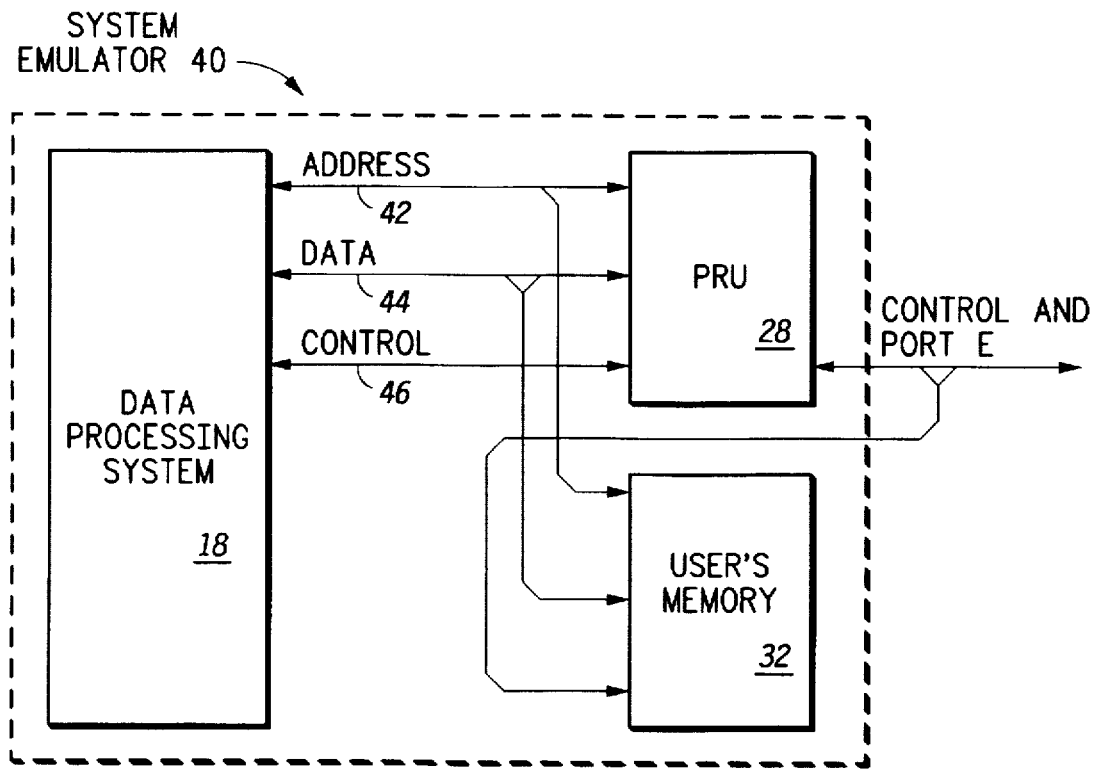
FIG. 6 illustrates, in block diagram form, an emulator in accordance with one embodiment of the present invention.

In one embodiment of the present invention, illustrated in FIG. 6, System Emulator 40 emulates expanded operation of Data Processing System 18. Data Processing System 18, Port Replacement Unit (PRU) 28, and User's Memory 32 are all part of System Emulator 40. Data Processing System 18 provides address information to PRU 28 and to User's Memory 32 by way of bi-directional conductors, Address 42, and in alternate embodiments, may be unidirectional conductors. Data Processing System 18, PRU 28, and User's Memory 32 each send and receive data information by way of bidirectional conductors, Data 44. Likewise, Data Processing System 18, PRU 28, and User's Memory 32 each send and receive control information by way of bidirectional conductors, Control 46. In one embodiment of the present invention, a user is able to emulate Data Processing System 18 using application code without modification using System Emulator 40. System Emulator 40 communicates with user's application through PRU 28. PRU 28 sends and receives information signals and control signals to user's application and User's Memory 32 by way of bi-directional conductors assigned to an expanded port.

Figure 7:
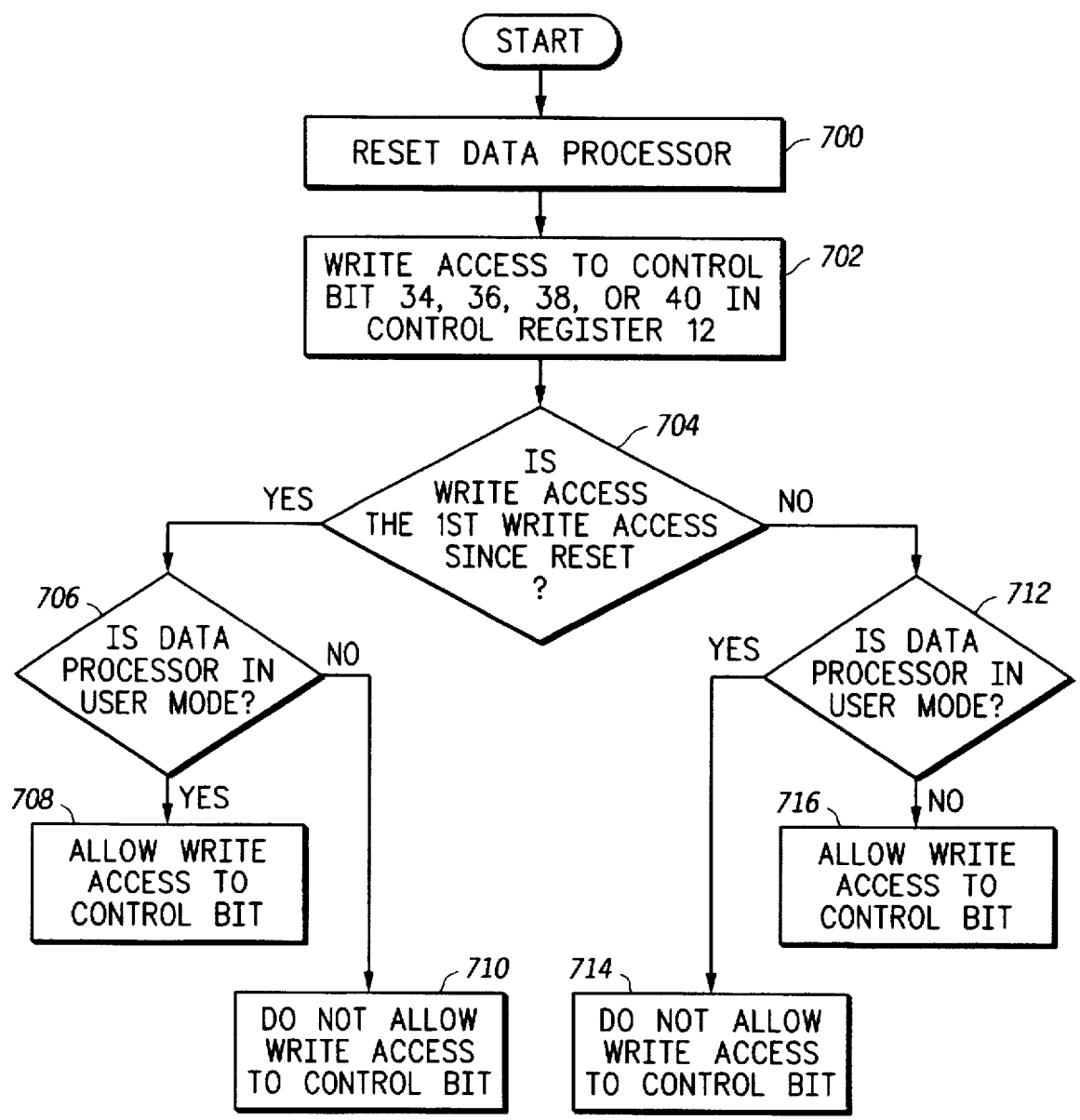
FIG. 7 illustrates, in flow diagram form, a method of accessing a control register in accordance with one embodiment of the present invention.

FIG. 7 illustrates a method of accessing control register 12 (FIG. 2) in data processor 2 (FIG. 1) according to one embodiment of the present invention. At block 700 the data processor 2 is reset, and a write access is made to control bit (34, 36, 38, 40) in control register 12 at block 702. If the write access of block 702 is a first write access after reset, process flow continues to decision block 706 from decision block 704. If the write access of block 702 is not a first write access after reset, process flow continues to decision block 712 from decision block 704. If data processor 2 is in user mode, process flow continues to block 708 from decision block 706. At block 708 a write access is allowed to the control bit (34, 36, 38, 40). If data processor 2 is not in user mode, process flow continues to block 710 from decision block 706. At block 710 the write access to the control bit (34, 36, 38, 40) has no effect (i.e. is not allowed).

From decision block 712, if data processor 2 is in user mode, process flow continues to block 714 where the write access to the control bit (34, 36, 38,40) has no effect. If data processor 2 is not in user mode, process flow continues to block 716 from decision block 712. At block 716 write access to the control bit (34, 36, 38, 40) is allowed (i.e. effective). The method of one embodiment of the present invention illustrated in FIG. 7 allows a first write access to the control bit (34, 36, 38, 40) to have no effect when in test mode (i.e. not in user mode). Conversely, FIG. 7 illustrates that a first write access to the control bit (34, 36, 38, 40) is effective the first time after reset but not for subsequent write accesses.

Operation of Preferred Embodiment

Control: Many data processors have sensitive control registers and bits which are protected against writes except under special circumstances. Referring to FIG. 1, in one embodiment of the present invention, Data Processor 2 may be operated in user mode, also referred to as normal mode, or in a "special" mode for testing and emulation. In user mode the internal operation of Data Processor 2 is not visible to the user. For user mode operation, application code is stored in Memory Unit 6.

In one embodiment, Data Processor 2 stores control information in Control Register 12. Control information defines the operation of CPU 4. In other words, control information indicates the control parameters affecting CPU 4 operating conditions. Control parameters can be changed or verified by accessing individual bits of Control Register 12.

For example, in one embodiment of the present invention, a control parameter is interrupt sensitivity. Interrupt sensitivity refers to the input condition which will trigger an interrupt, as where, for example, a rising edge will cause CPU 4 interruption from its normal operation. Interrupt sensitivity is selectable and has associated bit(s) in Control Register 12. Interrupt sensitivity is controlled by such bit(s). Likewise, other control parameters have associated bit(s) in Control Register 12. Alternate embodiments may have any number or combination of control parameters. Note that one control register is typically available for multiple control parameters.

A control parameter that is not consistent with the operating mode, or that will result in malfunction or unstable Data Processor 2 operation is considered a sensitive control bit. For accurate, robust operation, it is desirable to prevent inadvertent access to sensitive control bits, as it will create an unstable situation in a data processing system. Note that in alternate embodiments, any number of determinations are used to define a control bit as a sensitive control bit.

As illustrated in FIG. 2, in one embodiment of the present invention, Control Register 12 contains control bits NECLK 34, LSTRE 36, IVIS 38, and PORT CONTROL 40, where each affects a control in emulation and all are defined as sensitive control bits. The application code renders each bit according to a desired system configuration. Once sensitive control bits are defined, application code cannot change the definition until another reset occurs. Note that NECLK 34, LSTRE 36, IVIS 38, and PORT CONTROL 40 are exemplary of any number of possible sensitive bits and in alternate embodiments sensitivity is determined by the application and may include bits of other significance (e.g. non control bits.)

User or normal mode is the operating environment of the user and is therefore meant to be both flexible and robust. In one embodiment, both goals are accomplished by allowing the user to select certain control bits only once after resetting Data Processor 2. The user has flexibility in changing various controls as a situation warrants, but without resetting Data Processor 2, is precluded from varying controls once set.

"Special" Mode: In one embodiment of the present invention, a "special" mode allows visibility of the internal operation of Data Processor 2. Among other uses, "special" mode is used for user emulation of Data Processor 2. Emulation typically requires an emulation system which is used to replace the data processor. System Emulator 40 of one embodiment is illustrated in FIG. 6. System Emulator 40 contains Data Processor 2, which functions in "special" mode, where internal signals, such as Address 42, Data 44 and Control 46, are provided external to Data Processor 2. Providing external signals requires resources of Data Processor 2 which are normally assigned to various ports in user mode. System Emulator 40 contains PRU 28 which rebuilds the various ports. Based on inputs received from Address 42, Data 44, and Control 46, PRU 28 acts as the port resources of Data Processor 2 allowing external consistency. In this way, Data Processor 2 functions as a component enabling System Emulator 40 and System Emulator 40 functions as Data Processor 2 in the user's application.

System configuration is critical to proper operation during emulation. If the user changes the configuration, System Emulator 40 may function improperly or may cease to function completely. A problem exists where application code changes the configuration of the emulator. Often application code is modified for emulation purposes, eliminating any rendering of control bits. An obvious disadvantage is the need for two sets of application code, one for user mode and one for emulation. The present invention allows application code to be used during emulation, by disregarding or ignoring the initial write to a control bit. In one embodiment of the present invention PRU 28 utilizes an initial write to set up and rebuild ports.

In one embodiment of the present invention, as in FIG. 3, Special Write Control Circuitry 75 acts to affect and inhibit appropriate rendering of sensitive control bits in Control Register 12. Here, Control Register 12 contains control bits which are not sensitive, and sensitive control bits (e.g. Bit 1 71), as well as bits which are not control bits (e.g. Bit 0 70.) During "special" mode, Special Write Control Circuitry 75 will inhibit a first rendering of Bit 1 71, a sensitive control bit in this embodiment, but will not inhibit a first rendering of Bit 0 70, which is not a sensitive control bit. During normal mode, Special Write Control Circuitry 75 acts to enable an initial rendering of Bit 1 71, but will inhibit subsequent writes to Bit 1 71, while Register Decode Circuitry 50 affects initial and subsequent renderings of Bit 0 70. By combining control bit(s), non control bit(s), and sensitive control bit(s) in a single register, Data Processor 2 does not have excessive registers with reserved, unused bit(s).

FIG. 4 illustrates one embodiment of the present invention incorporating logic gates and other logic devices. Alternate embodiments may employ any type of circuitry which will affect similar control of sensitive control bit(s).

Application Code: In one embodiment of the present invention, application code is required to write to each control bit exactly once. Once each bit is written, a system configuration is defined and is to be maintained until the next reset. Application code can then be run in emulation where the first write to a sensitive control bit is ignored. Subsequent writes to a sensitive control bit are effective. Note that were the application code to contain multiple writes to a sensitive control bit, the emulator would most likely malfunction, providing the user a warning that the application code contains multiple writes to sensitive control bits.

In one embodiment of the present application, certain control bits are defined sensitive control bits only when their function affects emulation. In one embodiment sensitive control bits are combined in a Control Register 12. An alternate embodiment of the present invention defines all control bits as sensitive control bits. In other embodiments certain register bits are defined as sensitive which are not necessarily control bits.

In one embodiment of the present invention, NECLK 34 is a bit in Control Register 12 and is used to determine if Data Processor 2 will provide an external clock signal. In user mode, Bus Interface Unit 10 and peripherals use external clock signals. In "special" mode an external clock signal is used to track internal instruction paths and to affect bus interface as in Bus Interface Unit 10. System configuration depends on this determination. Additional resources will be available for port functions if an external clock signal is not provided. "Special" mode allows the user the flexibility to make this determination. Typically, an external clock signal is used in an expanded mode where signals which are not visible in user mode (e.g. address and data signals) are provided. However, once a decision is made, the user must render NECLK 34 only once as this is an essential decision to system configuration.

Application code is to include only one write to NECLK 34 after each reset. In one embodiment of the present invention, user mode allows only one write to NECLK 34 where all subsequent writes are disregarded, whereas "special" mode disregards the first write to NECLK 34 and affects all subsequent writes. A user is to write application code which conforms to the user mode requirement of only one write to NECLK 34. Application code is then available for emulation in "special mode", where the first write will be disregarded. This is critical in emulation where the system configuration is predetermined by the emulator. Additionally, were application code to mistakenly include multiple writes to these bits, emulation would reveal the error.

As seen in FIG. 2, one embodiment of the present invention has NECLK 34, LSTRE 36, IVIS 38, and PORT CONTROL 40 control bits combined in Control Register 12. Here LSTRE 36, IVIS 38, and PORT CONTROL 40 are also defined as sensitive control bits, as each associated control function affects emulation.

LSTRE 36 is used to enable a low strobe signal, which is provided by Data Processor 2. A low strobe signal utilizes system resources which would otherwise be available for port functions, and therefore the decision to enable LSTRE 36 is essential to system configuration considerations.

Likewise, IVIS 38 which enables internal visibility functions, and PORT CONTROL 40 which enables a certain port configuration, affect system resources and system configuration. IVIS 38 and PORT CONTROL 40 are essential to system configuration considerations. Note that while in one embodiment all four control signals affect system configuration and system resource allocation, it is possible for a user to define a system configuration that is not impacted by these decisions. However, typically control functions affecting system configuration are critical in Data Processor 2 application.

In one embodiment of the present invention, each of the four control functions is to be defined only once after reset, as each decision affects the system configuration. The system configuration depends on each control, as system resources are allocated accordingly and, once decided, system configuration is to be maintained.

Emulation: The present invention allows application code to be used in emulation without modification. In one embodiment, the user is free to write application code without considering accommodation for emulation. Application code is to write to sensitive control bits only once, establishing a user preference of operation. The user may then use application code directly for emulation. In emulation, the initial write to sensitive control bits is ignored, maintaining emulation system configuration. Application code containing multiple writes to sensitive control bits corrupts the emulator. Application code is generally written to satisfy normal operation requirements, where the initial write to a control bit is effective, but subsequent writes are ineffective.

Referring to FIG. 5, System Emulator 16 is used for debug, design, and investigation. System Emulator 16 uses PRU 26 to "talk" to a user application. System Emulator 16 "plugs into" or is connected to a user application. Data Processing System 18 performs as a virtual type user mode, even while actually operating in "special mode", allowing internal visibility during application operation. Emulation is essential in application design. In one embodiment of the present invention, System Emulator 16 uses the port resources of Data Processing System 18, where Data Processing System 18 contains Data Processor 2, making actual port resources unavailable for application use. In emulation, Data Processing System 18 operates in "special" mode, and changes to its operating environment will result in malfunction. Application code written for Data Processing System 18 includes instructions rendering sensitive control bits. For use in emulation, "special" mode disregards initial rendering, but allows all subsequent renderings. If application code performs only a single rendering of sensitive control bits, emulation will run smoothly.

In expanded emulation, Data Processing System 18, as in FIG. 6, again operates in "special" mode, but System Emulator 40 uses PRU 28 to interface with an expanded application. Here port resources are used for expanded bus functions rather than as ports. In emulation, changes in Data Processing System 18 operating environment will likewise result in malfunction.

The present invention allows any number of emulation techniques for Data Processor 2, while eliminating the need for modifying application code. An additional consideration is operation under test conditions.

Test: The present invention's register access scheme has added benefits for device testing. In one embodiment, Data Processor 2 is in "special" mode for testing, where a first write to each sensitive control bit is disregarded, but each subsequent write is effective. In contrast to emulation, testing requires efficient reconfiguration of the system. By disregarding a first write but affecting subsequent writes, Data Processor 2 can be tested in a variety of system configurations without executing reset sequences. This allows for both enhanced test time and increased production flexibility.

Conclusion: In conclusion, the present invention offers a method of accessing a register while protecting sensitive controls. By providing in a "special" mode that initial rendering of certain bits will be ineffective, but subsequent renderings effective, the present invention offers a consistent solution for emulation and test. Sensitive controls are protected from improper use, and a user need not duplicate efforts by creating a modified application code for emulation. The present invention is consistent for use in device testing, still allowing repeated access to sensitive control bits during test.

While the present invention has been illustrated and described with reference to specific embodiments, further modifications and improvements will occur to those skilled in the art. For example, although several uses for the present invention have been described herein, there are a wide variety of uses for a "first write has no effect, at least one subsequent write has effect" register bit or memory location within an integrated circuit. Note that alternate embodiments of the present invention may cause the "first N writes" to have no effect, where "N" is a predetermined integer, or alternately is a variable programmed by the user, or alternately is a value determined by hardware (e.g. a value incremented in a counter.) It is to be understood, therefore, that this invention is not limited to the particular forms illustrated and that the appended claims cover all modifications that do not depart from the spirit and scope of this invention.

We claim:

1. A method for operating a data processor, said method comprising the steps of:

performing a first write access to a first control bit, the first write access being an initial write access after a reset of the data processor, wherein the first control bit is for configuring at least one parameter of the data processor;

causing the first write access to the first control bit to have no effect on the first control bit;

performing a second write access to the first control bit, wherein the second write access is subsequent to the first write access;

causing the second write access to the first control bit to affect the first control bit;

performing a third write access to the first control bit, wherein the third write access is subsequent to the second write access; and causing the third write access to the first control bit to affect the first control bit.

2. A method as in claim 1, further comprising the steps of:

performing a first write access to a second control bit;

causing the first write access to the second control bit to have no effect on the second control bit;

performing a second write access to the second control bit; and causing the second write access to the second control bit to affect the second control bit.

3. A method as in claim 2, wherein the first control bit and the second control bit are part of a control register.

4. A method as in claim 1, where said data processor is in a first operating mode.

5. A method as in claim 4, wherein the first operating mode is used for emulation.

6. A method as in claim 4, wherein the step of performing the first write access to the first control bit further comprises:

if the data processor is in a second operating mode causing the first write access to the first control bit to affect the first control bit.

7. A method as in claim 6, wherein the step of performing the second write access to the first control bit further comprises:

if the data processor is in the second operating mode causing the second write access to the first control bit to have no effect on the first control bit.

8. A method as in claim 6, wherein the second operating mode is a user mode.

9. A method as in claim 4, wherein the first operating mode is used for test.

10. An integrated circuit, said integrated circuit comprising:

a register; and control circuitry coupled to the register for determining if a present write access to the register is a first write access after reset;

wherein if the present write access to the register is the first write access to the register after reset, said control circuitry will cause the present write access to the register to have no effect on the register; and wherein if the present write access to the register is not the first write access to the register after reset, said control circuitry will cause the present write access to the register to affect the register by writing to the register.

11. A integrated circuit as in claim 10, wherein said integrated circuit is in a first operating mode.

12. An integrated circuit as in claim 11, said integrated circuit has a second operating mode, wherein if the present write access to the register is the first write access to the register after reset, said control circuitry will cause the present write access to the register to affect the register by writing to the register; and wherein if the present write access to the register is not the first write access to the register after reset, said control circuitry will cause the present write access to the register to have no effect on the register.

13. An integrated circuit as in claim 12, further comprising:

a memory storage unit storing an application program compatible with the first operating mode and the second operating mode.

14. An integrated circuit as in claim 13, wherein the first operating mode is used for emulation.

15. An integrated circuit as in claim 10, wherein the register comprises control bits.

16. An integrated circuit as in claim 10, wherein the register comprises control bits and status bits.

17. A method for operating a data processor, said method comprising the steps of:

resetting the data processor, wherein a control register for configuring the data processor is enabled;

performing a first write access to a first control bit in the control register, the first write access being an initial write access after reset while the control register is enabled;

causing the first write access to the first control bit to have no effect on the first control bit;

performing a second write access to the first control bit, wherein the second write access is subsequent to the first write access while the control register is enabled; and causing the second write access to the first control bit to affect the first control bit.

18. The method of claim 17 further comprising the steps of:

performing a first write access to a second control bit;

causing the first write access to the second control bit to have no effect on the second control bit;

performing a second write access to the second control bit; and causing the second write access to the second control bit to affect the second control bit.

19. The method of claim 17 further comprising the step of placing the data processor in a first operating mode which causes the first write access to the first control bit to have no effect on the first control bit.

* * * * *